United States Patent [19]

Bentjens

[11] Patent Number: 5,090,845
[45] Date of Patent: Feb. 25, 1992

[54] DISC MILL WITH REVERSIBLE CUTTING PLATES AND ADJUSTABLE CUTTING WIDTH

[75] Inventor: Bernd Bentjens, Schwarzenbek, Fed. Rep. of Germany

[73] Assignee: Firma Wulhelm Fette GmbH, Schwarzenbek, Fed. Rep. of Germany

[21] Appl. No.: 572,464

[22] Filed: Aug. 23, 1990

[30] Foreign Application Priority Data

Sep. 1, 1989 [DE] Fed. Rep. of Germany ....... 3929007

[51] Int. Cl.$^5$ ............................................. B26D 1/12
[52] U.S. Cl. ........................................ 407/52; 407/58; 407/76
[58] Field of Search .............. 407/52, 56, 76, 51, 407/58, 67, 70; 409/239

[56] References Cited

U.S. PATENT DOCUMENTS

| | | | |
|---|---|---|---|
| 1,551,015 | 8/1925 | Duchesne | 407/58 X |
| 1,714,700 | 5/1929 | Stull | 407/52 |
| 2,230,662 | 2/1941 | Whitman | 407/58 X |
| 2,646,611 | 7/1953 | Bauer | 407/52 X |
| 4,097,174 | 6/1978 | Heinlein | 407/56 X |
| 4,171,926 | 10/1979 | Dusza | 407/52 |
| 4,433,948 | 2/1984 | Kodama | 407/58 X |
| 4,464,086 | 8/1984 | Bentjens | 407/52 X |

Primary Examiner—Larry I. Schwartz
Assistant Examiner—Julie R. Daulton
Attorney, Agent, or Firm—Michael J. Striker

[57] ABSTRACT

A disc mill comprises a plurality of reversible cutter plates arranged in an alternating order and having an adjustable cutting width, a base body composed of at least two disc, a plurality of claw-like posts provided on each of the discs and carrying a respective one of the reversible cutter plates. The posts of one of the discs engage in a coupling-like manner in a chamber between two neighboring posts of the other disc.

12 Claims, 6 Drawing Sheets

DISC MILL WITH REVERSIBLE CUTTING PLATES AND ADJUSTABLE CUTTING WIDTH

BACKGROUND OF THE INVENTION

The present invention relates to a disc mill with tangentially and alternatingly arranged reversible cutting plates of hard metal and adjustable cutting width.

In known disc mills with adjustable cutting width the base body is formed as a one-piece element and carries a plurality of posts uniformly distributed over its periphery. Chambers are formed between the posts and receive each a cassette which carries a reversible plate. The reversible plates are arranged in cross-like or alternating arrangement. For holding of the cassettes, wedge-like clamping elements are provided and held also by a screw. In order to change the cutting width by for example one or several millimeters, first the clamping elements must be released and then with the aid of adjusting screws the individual cassettes which carry the reversible plates must be adjusted to the new desired cutting width and then again secured. When such a disc mill carries eighteen reversible cutting plates arranged in the cross-like toothing, eighteen clamping elements must be released, then eighteen cassettes must be adjusted, and finally again secured in the new position. This operation is connected with significant expenses. A further disadvantage is that by subdivision of the periphery of the mill disc into posts, cassettes, clamping elements, only a long tooth pitch and thereby the use of relatively low number reversible cutting plate is possible.

SUMMARY OF THE INVENTION

Accordingly, it is an object of the present invention to provide a disc mill which avoids the disadvantages of the prior art.

More particularly, it is an object of the present invention to provide a disc mill in which changes in the cutting width require only low labor consumption.

In keeping with these objects and with others which will become apparent hereinafter, one feature of the present invention resides, briefly stated, in a cutting mill in which the base body is composed of at least two discs having claw-shaped posts which engage with one another, so that the posts of one disc engage in a chamber between two posts of another disc in coupling-like manner, and the reversible plates are mounted directly on the outer side of the posts. Therefore, an adjustment of the distance between two discs permits a change in the cutting width without adjusting of the individual reversible plates. By displacement of one disc relative to the other disc, simultaneously all reversible plates are displaced so that significantly low labor expenses are required.

Moreover, in the disc mill of the invention the cassette shaped supports and additional clamping elements are dispensed with, and therefore a significantly narrow tooth pitch can be obtained with the resulting use of a greater number of the reversible cutting plates.

The discs which together form the base body can be assembled by screws. The screws extend through openings in one disc and into threaded openings into the other disc. It is advantageous when the number of screws corresponds to the number of the posts in one disc.

An adjustment of the mill to a desired cutting width can be performed by the arrangement of spaces between both discs in a very simple manner. The spacers can be composed of individual discs which for example are fitted as ring discs on connecting screws and brought to a desired thickness by a preceding plane milling. The handling is also simplified when the spacers are formed as two rings arranged concentrically relative to one another and including the inner ring formed as a so called mandrel ring.

The posts which carry the individual reversible plates and in particular each carrying one plate can be inclined or rounded on their front and rear sides. In this case relatively big clamping chambers are formed between the successive reversing plates arranged in a cross-way on respective posts.

In accordance with an especially advantageous feature of the present invention, the discs of the base body can be identical or approximately identical. A difference in the discs can be limited to the fact that one disc is provided with throughgoing openings for the holding screws, while the other disc is provided with threaded openings. Also, when the discs have an odd number of posts, the groove in the central opening is oriented in case to one post and in another case to a chamber between the posts. Since the formation of these parts of the mill is however required after the fabrication of the discs in their base shape, both discs can be produced with the same shape as to its basic structure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
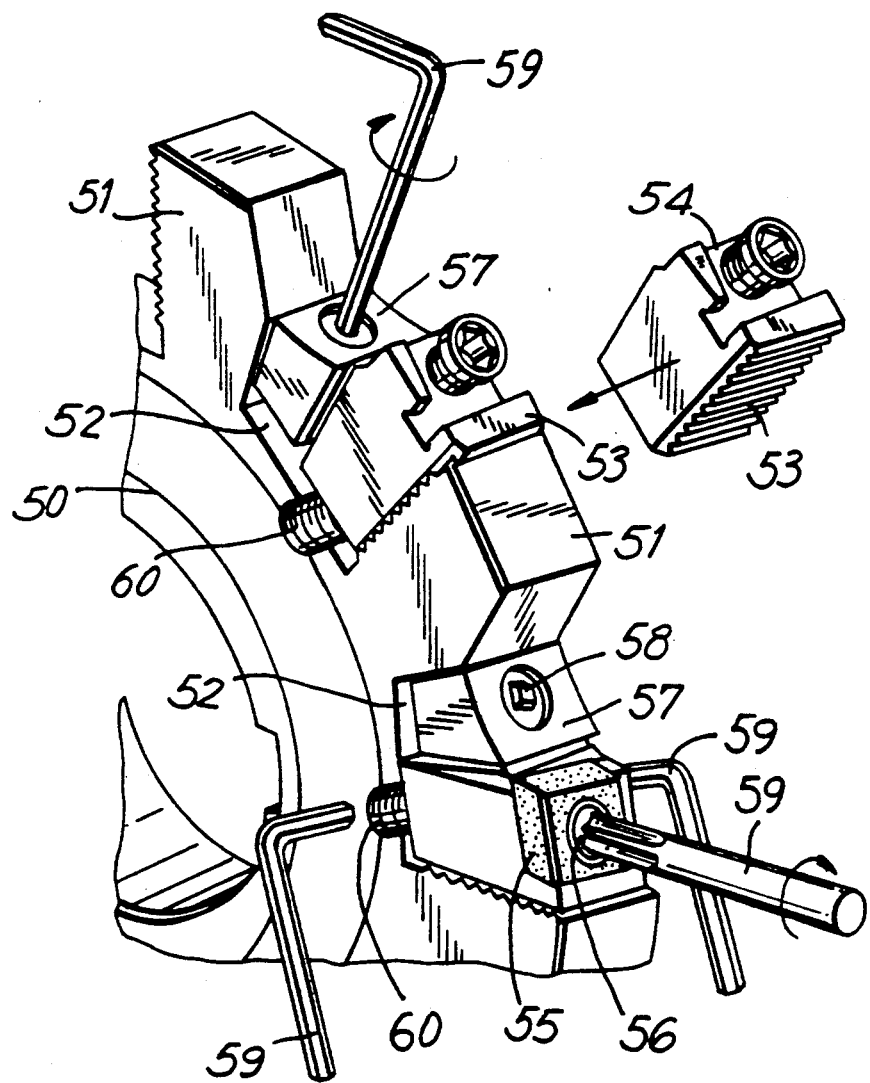
FIG. 1 is a partial view of a known disc mill.
Figure 2:
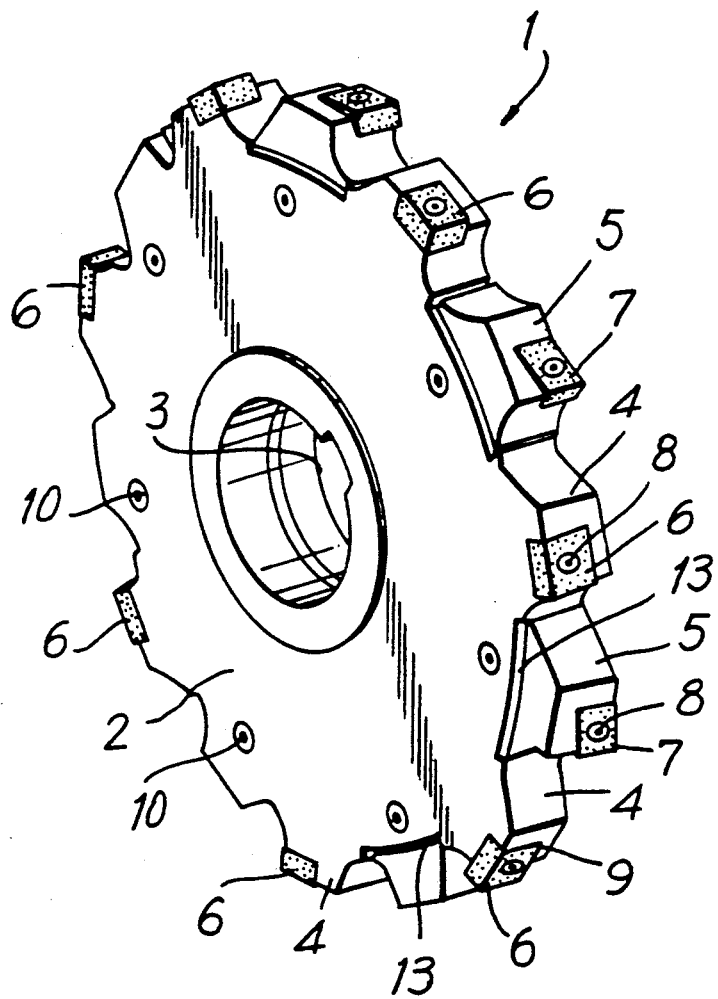
FIG. 2 is a perspective view of a mill in accordance with the present invention.
Figure 3:
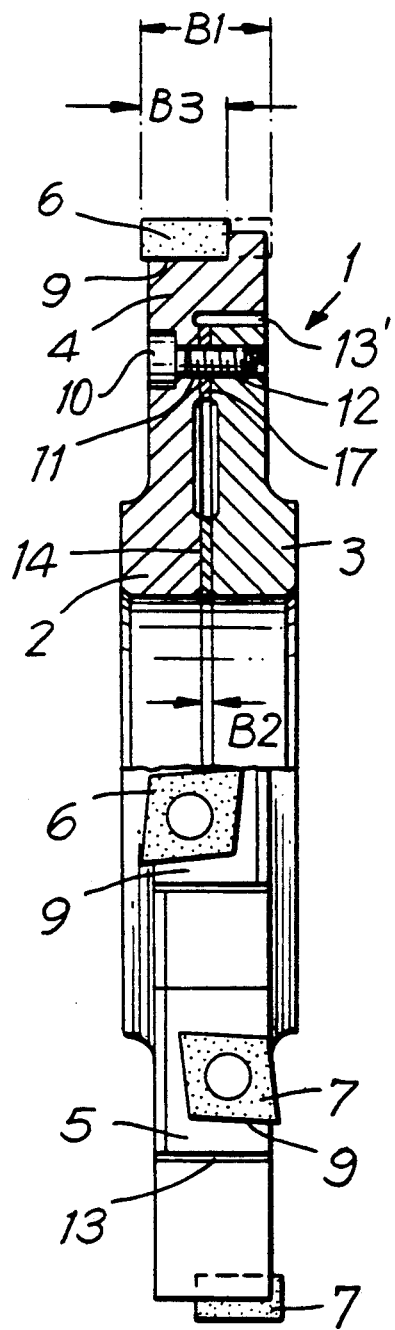
FIG. 3 is a view showing a section taken through the mill of FIG. 2.
Figure 4:
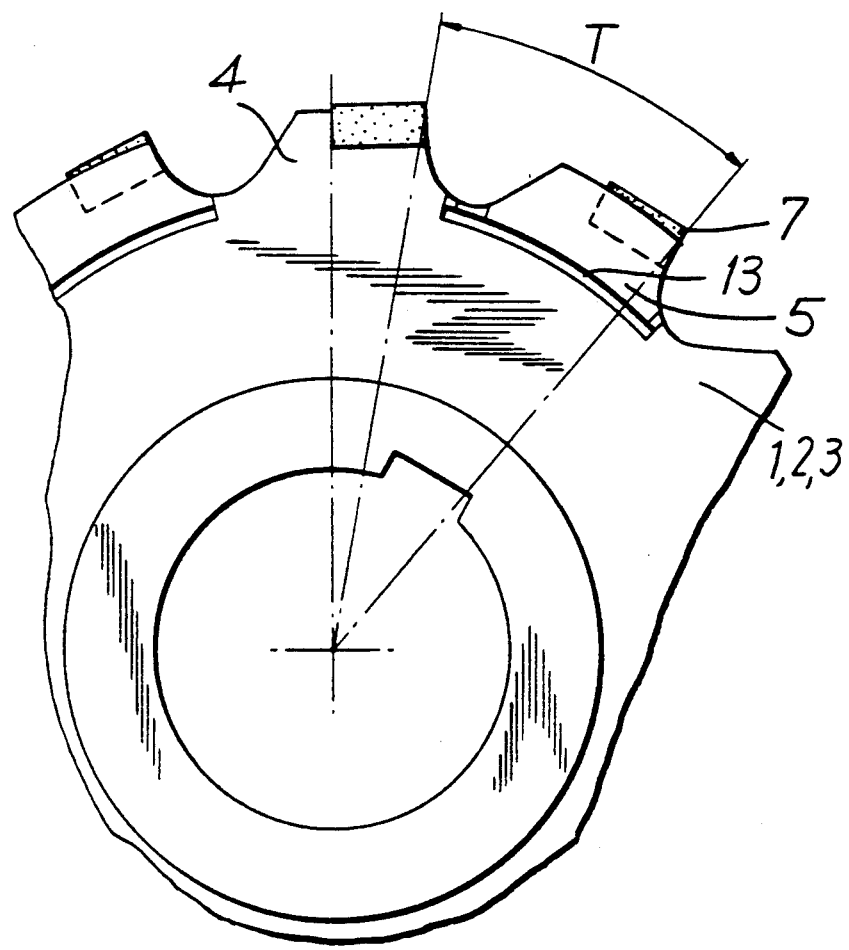
FIG. 4 is a partial side view of the disc of the mill in accordance with the present invention.
Figure 5:
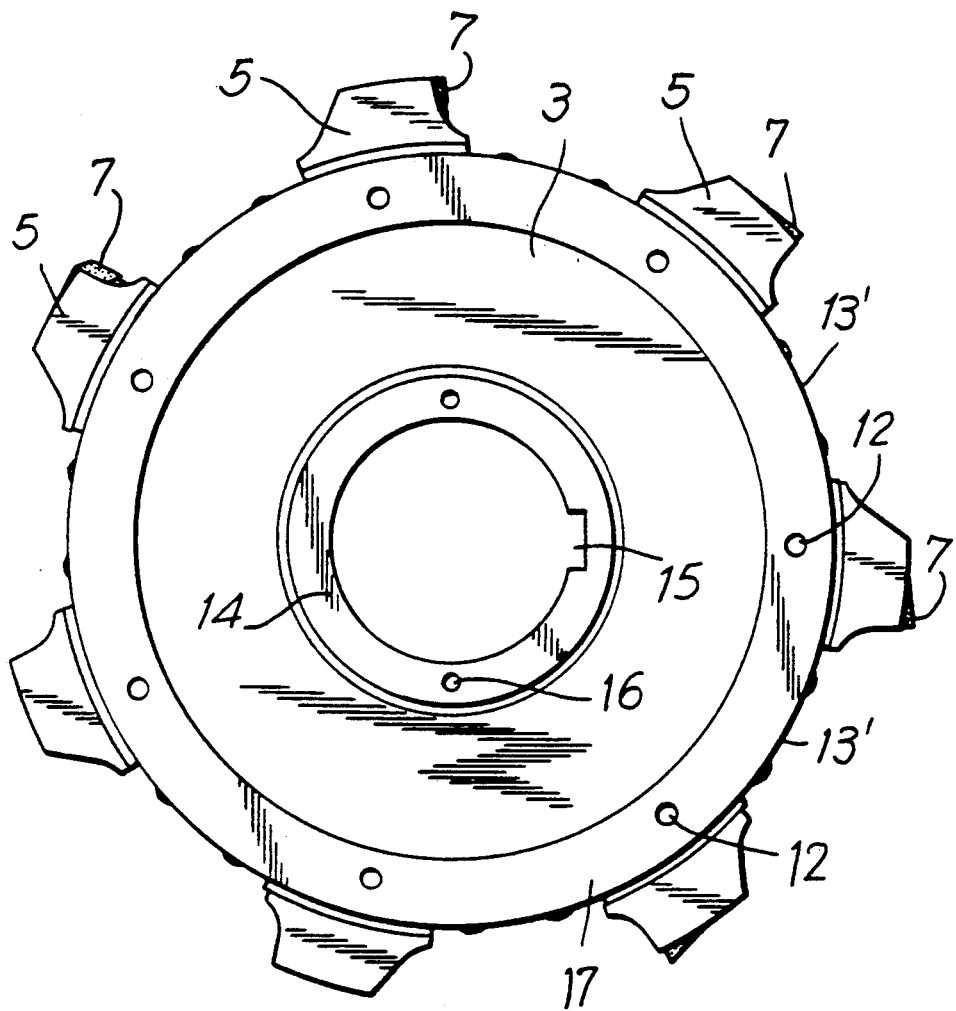
FIG. 5 is a view showing an inner side of a mill disc in accordance with the present invention.
Figure 6:
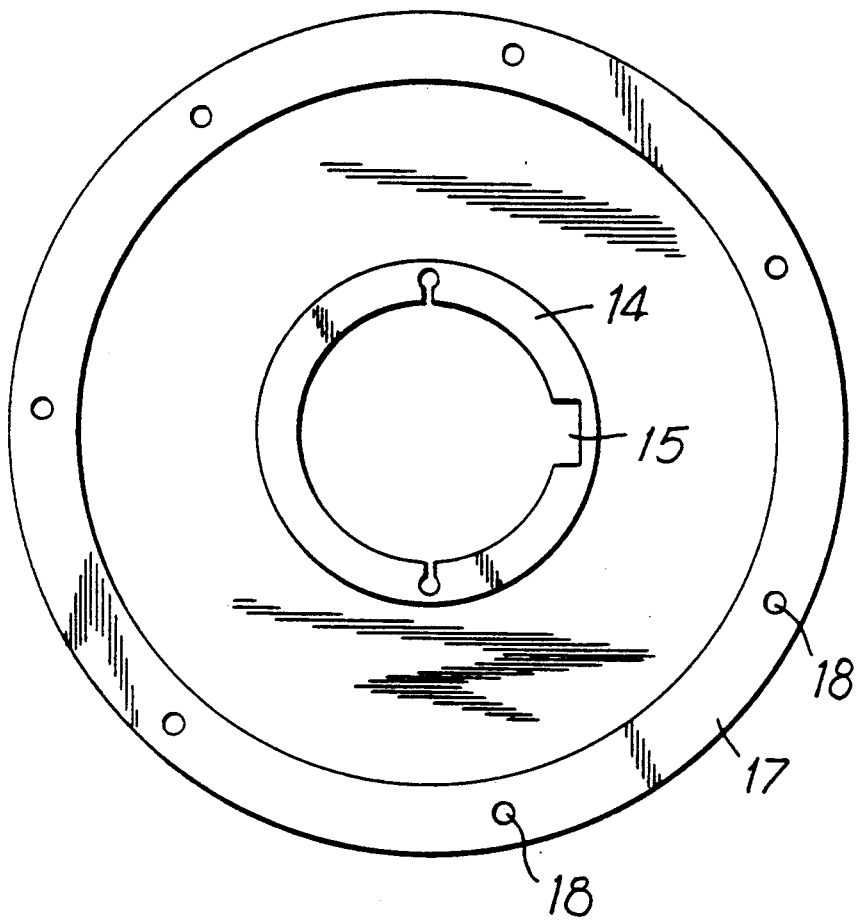
FIG. 6 is a view showing two spacer rings of a disc mill of the invention.

FIG. 1 shows a known mill which is provided with a base body 50 formed as one-part element. The base body 50 carries a plurality of uniformly distributed posts 51 on its periphery. Chambers 52 are formed between the posts 51. The chambers 52 are provided to receive cassettes 53 each carrying a reversible cutter plate 55 in the respective chamber 54. The arrangement is selected so that the reversible cutter plates cut in cross toothing or in other words alternatingly project beyond the left edge and the right edge. The reversible cutter plates 55 are held by screws 56 and adjustable in an axial direction by adjusting the screws 60. Before and after this it is necessary however to loosen and tighten wedge-shaped clamping elements 57 which are provided for this purpose with screws 58. The screws 58 are actuated by a key 59 and adjusting screws 60. The change of the effective cutting width of the mill is performed therefore with a considerable labor consumption. In the inventive disc mill shown in FIGS. 2-6 this is different.

The disc mill which is identified as a whole with reference numeral 1 has a base body composed of a first disc 2 and a second disc 3. The first disc 2 has seven posts 4 and the second disc 3 also has seven posts 5. Chambers 13 are provided between the posts 4 of the disc 2, and also between the posts 5 of the second disc 3. Since the posts 4 and 5 are oriented so that they extend perpendicularly to the plane of the discs 2 and 3 and their inner side, the claw-shaped posts engage in a coupling-like manner into a chamber between the posts of the neighboring disc. On their outer side, the posts 4 and 5 are respectively provided with a reversible cutter plate chamber 9 for receiving of reversible cutter plates 6 on the first disc 2 with respect to its posts 4 and for receiving of the reversible cutter plates 7 on the posts 5 of the second disc.

Screws 10 are provided for connecting both discs 2 and 3 with one another. The number of the screws 10 corresponds to the number of the posts of one disc, namely seven. These screws 10 extend through throughgoing openings 11 of the first disc 2 into threaded openings 12 of the second disc 3.

The distance between the discs 2 and 3 and therefore the effective cutting width of the disc mill 1 can be adjusted by the utilization of spacers with different thicknesses. In the embodiment shown in the drawings, the spacers include an inner spacer ring 14 and an outer spacer ring 17. The inner spacer ring is formed as a so-called mandrel ring. In other words, it is provided with a groove 15 for receiving a wedge of a not shown drive shaft. The inner spacer ring 14 has openings 16 for passing of screws for mounting. Similarly, the outer spacer ring has openings 18 shown in FIG. 6 for the screws 10, which connect both discs 2 and 3 with one another.

The cutting width B 1 of the disc mill is composed on the one hand of the width B 3 of the reversible cutter plate and the distance B 2 between the discs 2 and 3. Therefore great cutting widths changes are possible without significant conversions for one or another case. A limit of the cutting width is performed in that an opposite overlap of the reversible cutter plates 6 and 7 shown in FIG. 3 above relative to the cutting width B 1 is smaller than the double width B 3 of the reversible cutter plates.

The posts 4 and 5 are inclined on their front side and rear side such as for example rounded to form relatively big clamping chambers 20. The pitch T in FIG. 4 can be very narrow since there are no additional components for receipt and holding of the reversible cutter plates.

A further advantage of the inventive construction is that a conversion of the tool from one cutting width to another cutting width can be performed in several minutes with high accuracy by the use of plan-ground spacer rings, without adjusting or measuring operation for the exact adjustment of individual reversible cutter plates.

It will be understood that each of the elements described above, or two or more together, may also find a useful application in other types of constructions differing from the types described above.

While the invention has been illustrated and described as embodied in a disc mill it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A disc mill comprising a base body composed of two discs; a plurality of claw-like posts provided on each of said discs and carrying reversible cutter plates, each of said posts of one of said discs protruding into a chamber between two nearest circumferentially adjacent neighboring posts of the other disc, said posts having outer sides provided with cutter plate chambers, said reversible cutter plates being arranged tangentially staggered and alternatingly in said cutter plate chambers.

2. A disc mill as defined in claim 1, wherein said posts extend substantially perpendicular to a plane of a respective one of said discs and project toward an inner side of a respective one of said discs.

3. A disc mill as defined in claim 1, wherein an actual distance between said at least two discs is adjustable.

4. A disc mill as defined in claim 1, wherein one of said discs is provided with threaded openings and the other of said discs is provided with throughgoing openings for screws for connecting said discs with one another.

5. A disc mill as defined in claim 1, wherein said posts are inclined at their front sides and at their rear sides.

6. A disc mill as defined in claim 1, wherein said posts are round at their front side and at their rear side.

7. A disc mill as defined in claim 1, wherein said discs are identical to one another.

8. A disc mill as defined in claim 1, wherein said discs are approximately identical to one another.

9. A disc mill as defined in claim 1; and further comprising screws for connecting said discs with one another, said screws being provided with a number corresponding to a number of said posts of one of said discs.

10. A disc mill as defined in claim 1; and further comprising exchange spacers arranged between said at least two discs.

11. A disc mill as defined in claim 10, wherein said spacers are formed as rings.

12. A disc mill as defined in claim 11, wherein said spacers include inner spacers formed as mandrel rings.

* * * * *